April 14, 1931.  W. R. FREEMAN ET AL  1,800,520
CLUTCH BRAKE CONTROL
Filed Oct. 15, 1928  2 Sheets-Sheet 1
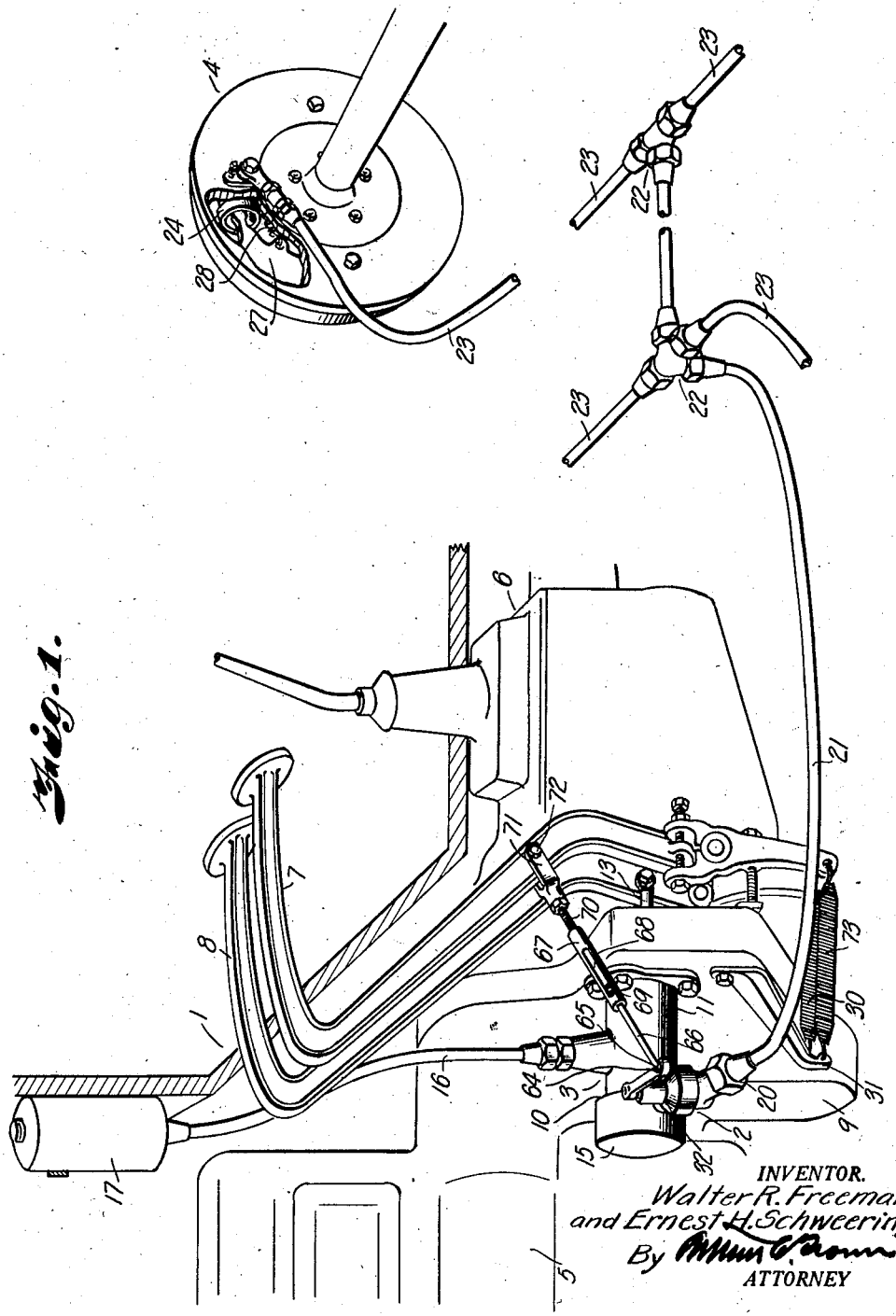

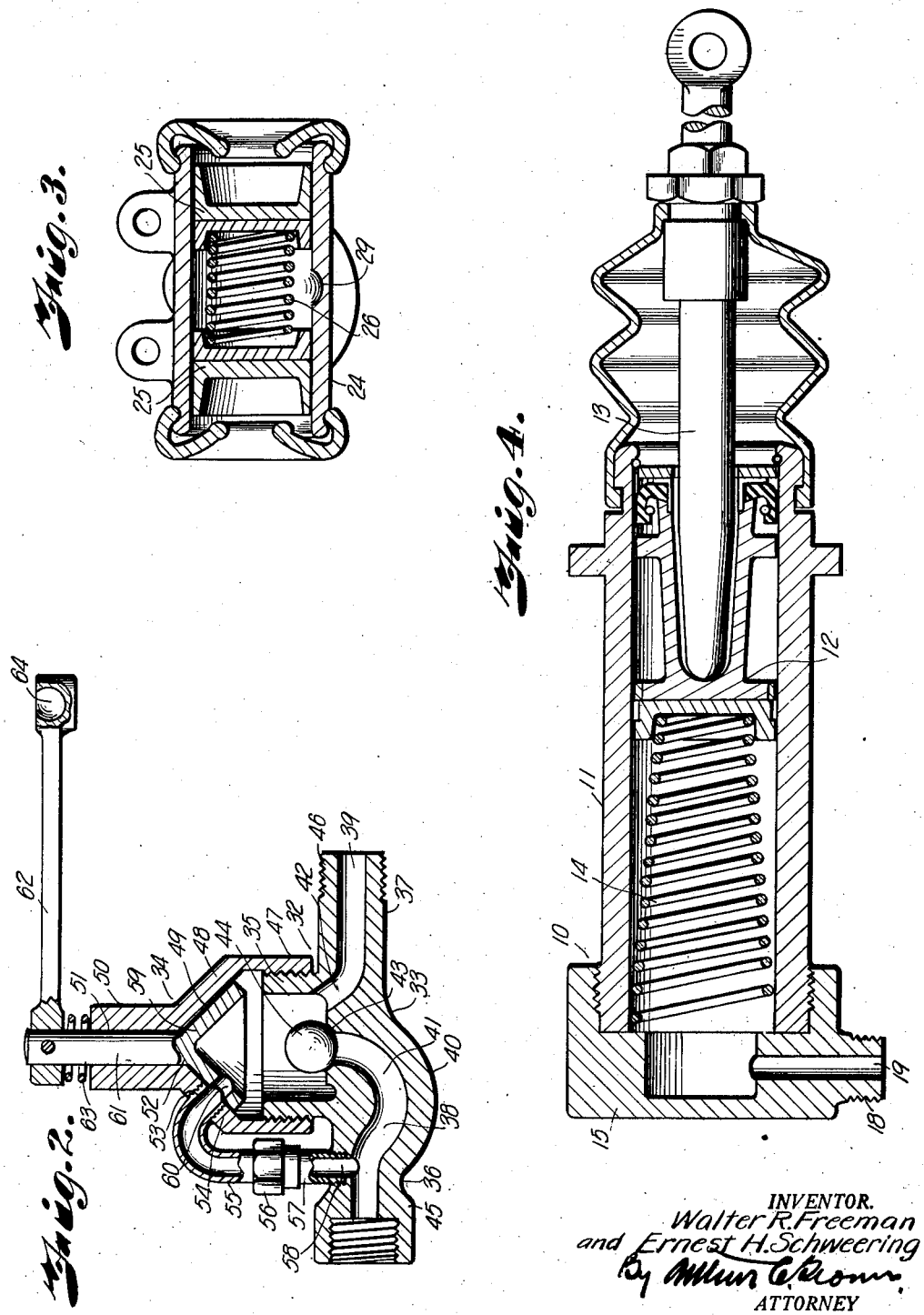

Patented Apr. 14, 1931

1,800,520

UNITED STATES PATENT OFFICE

WALTER R. FREEMAN AND ERNEST H. SCHWEERING, OF TULSA, OKLAHOMA, ASSIGNORS TO MIDWEST ENGINEERING CO., OF TULSA, OKLAHOMA, A CORPORATION OF OKLAHOMA

CLUTCH BRAKE CONTROL

Application filed October 15, 1928. Serial No. 312,490.

Our invention relates to control of the brakes of motor driven vehicles, and has for its principal object to so coordinate the controls of the vehicle brake and power transmitting mechanisms that after the brakes have been applied they will remain set until released by a letting in operation of the transmission controlling mechanism, thereby assuring greater safety and simplifying control of vehicles in heavy traffic.

In accomplishing these and other objects of the invention we have provided improved details of structure the preferred forms of which are illustrated in the accompanying drawings, wherein:

Fig. 1 is a perspective view of our improved control attachment in its assembled relation with hydraulic brake apparatus of a motor vehicle.

Fig. 2 is a vertical sectional view through the control valve of our attachment.

Fig. 3 is a sectional elevational view through the wheel cylinder of the conventional hydraulic brake apparatus.

Fig. 4 is a sectional plan view through the compressor cylinder of the conventional hydraulic brake apparatus.

Referring in detail to the drawings:

1 designates a motor vehicle, parts of which are broken away for better illustration of our brake control mechanism 2 in its operative connection with the functional elements of the hydraulic brake apparatus 3, one of the wheel brake drums 4 being shown with contained elements of the wheel brake apparatus.

The vehicle 1 includes the usual power unit 5 and power transmission 6 wherein a clutch (not shown) is operable by a pivoted foot pedal lever 7 for effecting operative connection or disconnection of the power unit with the wheels of the vehicle.

Pivotally mounted on the transmission housing adjacent the clutch pedal lever 7 is the brake pedal lever 8 cooperating with the conventional hydraulic brake apparatus 3 presently described.

Mounted on the frame portion 9 of the transmission 6 is a compressor unit 10 including a cylinder 11 fitted with a piston 12, having a stem 13 extending through the frame and connecting with the brake pedal 8.

The piston is movable forwardly in the cylinder 11 by the brake pedal lever and its return movement is effected by a compression spring 14 confined between the forward end of the piston and a cylinder head 15.

The cylinder 11 is fitted with an inlet conduit 16 leading to a liquid supply tank 17 from which a liquid pressure medium is supplied to the cylinder and its complementary apparatus for supplementing the loss of liquid in the system due to leakage.

Provided on the cylinder head 15 is a threaded boss 18 having an opening 19 communicating with the cylinder. In present common practice the boss is engaged by a suitable fitting 20 which connects the cylinder with a pressure flow line 21.

Attached to the flow line 21 at suitable locations on the chassis frame are manifold fittings 22 provided with connecting supply tubes 23 leading to the brake mechanism of the vehicle wheels.

Mounted in the stationary brake drum member of each wheel is a cylinder 24 fitted with opposed pistons 25 yieldingly urged apart by a spring 26.

The outer end of each piston is engaged by the upper end of a pivoted brake shoe 27 having external arcuate face portions adapted for engaging the internal portion of the brake drum.

The upper ends of the brake shoes are connected by an expansion spring 28 adapted to overcome the compression spring 26 and thereby normally retain the brake shoes in released position and the pistons at their inward limit in the cylinders.

The pressure medium supply tubes connect with centrally located openings 29 in the cylinders so that the pressure medium is admitted between the pistons in their retracted position thereby forcing the pistons outwardly when the pressure is applied.

Assuming that the entire system including the compressor cylinder 11, flow line 21, flow line fittings 22, tubes 23 and wheel cylinders 24 are filled with a liquid pressure medium, it is apparent that pressure exerted on the pedal of brake lever 8 will cause the piston 12 to move into the cylinder and thereby compress the liquid throughout the system.

Compression of the liquid in the wheel cylinders 24 causes the pistons 25 to be forced outwardly against the resistance of the spring 28, and the brake shoes 27 to frictionally engage the rotatable brake drum member.

When the brake lever is released, it is returned to its normal retracted position by and expansion spring 30 connecting the lower end of the lever with a bracket 31 on the frame portion 9 of the transmission.

With the release of the brake lever, the piston 12 is returned to its normal position in the cylinder 11 by the spring 14, thus under ordinary practice, permitting the liquid to return to the cylinder chamber, and thereby relieving the pressure in the system, whereupon the springs 28 in the brake drums cause the brake shoes to be retracted from frictional engagement with the rotatable drum member.

The mechanism for controlling release of the brakes from the power transmission controls in accordance with our invention comprises a housing 32 interposed in the flow line 21 and including a body member 33 having a cup portion 35, and opposite extensions 36 and 37 having threaded ends 45 and 46 connected respectively with the boss 18 of cylinder head 15 and with the line 21, and having channels 38 and 39 opening to the bottom of the cup 35; the extension 36 being enlarged at 40 to permit the channel to form the dip 41 and thence open upwardly through the bottom of the cup with a minimum enlargement of the housing.

Surrounding the port of channel 38 is a seat 43 for a ball valve 44 whereby return of liquid to the compressor cylinder is prevented under the conditions presently described. The channel 39 of extension 37 communicates with the cup through an inclined throat 42 opening to the corner of the cup chamber so that under no conditions of operation can the ball valve 44 close the channel 39 and prevent flow through the channel to or from the chamber.

Threaded onto the cup 35 of housing 32 is a cap 47 having a reducing section 48 providing an interior, conical valve seat 49 above the cup, and a tubular extension 50 providing a bearing channel 51.

Rotatably mounted between the cup 35 and valve seat 49 is a conical valve 59 having a port 60 adapted to register with the channel 53 of a conduit 55 opening through a wall of the extension 48 and leading through a coupling 56, nipple 57 and port 58 into the channel 38, thereby providing for by-pass of pressure liquid around the valve 44.

The valve head 59 has a stem 61 rotatable in the bearing channel 51, and fixed to said stem is a lever arm 62 yieldingly spaced from the end of the tubular extension 50 by a spring 63 which surrounds the stem and yieldingly retains the conical valve head 59 to its seat.

Connected with the end of the lever 62 by a ball and socket joint 64—65 is a link 66 extended into and having a cross head 69 slidable in the slots 68 of a coupling sleeve 67 having threaded connection with the shank 70 of a yoke 71 connected by a pin 72 with the clutch lever 7; the cross head normally resting at the outer ends of the slots (Fig. 1).

With a motor vehicle equipped with our control mechanism running with its clutch in and brake off, the parts appear as illustrated in the accompanying drawings, the flow line to the respective brake band cylinders communicating with the brake lever cylinder through the by-pass.

When the brakes are to be applied momentarily without stopping the vehicle or the speed changed, the levers are operated as in ordinary practice, the sleeve on the clutch lever connection sliding over the link 66 but the lever not being depressed sufficiently to shift the cross head 69 and its connected parts.

If, however, the vehicle is moving in traffic and a stop of uncertain duration is made, the driver when throwing out his clutch depresses the clutch lever to its fullest extent, thereby shifting the link 66 and rocking the valve 59 (Fig. 2) and closing the by-pass around valve 44. Then when he depresses the brake lever the pressure fluid is forced to the flow line and brake band cylinders through the main channel 38 by unseating the valve 44, but can not return through the main line because of closure of the valve 44 by back pressure, nor through the by-pass as long as the valve 59 is retained closed by depression of the clutch pedal. Consequently the driver may remove his foot from the brake pedal as soon as the clutch lever has been depressed and the brakes applied, controlling release of the brakes from the single and more easily operated clutch lever. It is apparent that such operation reduces the physical strain and hazard of driving in traffic where the brakes must be applied frequently, or for uncertain periods, and that such reduction of strain and hazard is effected without loss of braking power or interference with other driving or control features.

What we claim and desire to secure by Letters Patent is:

1. In combination with control apparatus for motor vehicles including transmission clutch mechanism and hydraulic brake mechanism employing a liquid pressure medium, a manually operable compressor unit and a pressure actuated brake unit, a conduit connecting said units, and a by-pass valve interposed in said conduit, telescoping link members operatively connecting the valve with the clutch mechanism.

2. In combination with control apparatus for motor vehicles including transmission clutch mechanism and hydraulic brake mechanism, employing a liquid pressure medium, a manually operable compressor unit, and a pressure actuated brake unit, a conduit connecting said units, a by-pass valve interposed in said conduit and having an arm, telescoping link members connected with said arm and adjusting means on said members connecting with the clutch mechanism.

3. In a vehicle provided with clutch control mechanism and with a fluid-operated brake unit, the combination with a conduit for conveying the operating fluid to the brake unit, a valve in said conduit, and valve closing means operable in response to a predetermined movement of an element of the clutch control mechanism.

4. In a vehicle provided with clutch control mechanism and with a fluid-operated brake unit, the combination with a conduit for conveying fluid to the brake unit, valve means associated with said conduit and operable to prevent back flow of fluid therethrough but not to prevent flow of fluid in pressure applying direction, and valve operating means governed by the clutch control mechanism.

5. In combination with the brakes, and the brake and clutch control levers of a motor vehicle, a compressor operable by the brake lever, a flow line leading from the compressor to the respective brake members, a back-check valve in said flow line, a normally open by-pass in said line about the back-check valve, and a valve operable by the clutch control lever for closing and re-opening the by-pass valve.

In testimony whereof we affix our signatures.

WALTER R. FREEMAN.
ERNEST H. SCHWEERING.